(12) United States Patent
Sharpe

(10) Patent No.: US 11,939,044 B2
(45) Date of Patent: Mar. 26, 2024

(54) LANDING GEAR SYSTEM FOR AN AIRCRAFT

(71) Applicant: AIRBUS OPERATIONS LIMITED, Bristol (GB)

(72) Inventor: Peter Sharpe, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 162 days.

(21) Appl. No.: 17/604,352

(22) PCT Filed: Sep. 2, 2020

(86) PCT No.: PCT/EP2020/074507
§ 371 (c)(1),
(2) Date: Oct. 15, 2021

(87) PCT Pub. No.: WO2021/047980
PCT Pub. Date: Mar. 18, 2021

(65) Prior Publication Data
US 2022/0177118 A1 Jun. 9, 2022

(30) Foreign Application Priority Data
Sep. 13, 2019 (GB) ...................... 1913269

(51) Int. Cl.
*B64C 25/22* (2006.01)
*F15B 15/22* (2006.01)
(Continued)

(52) U.S. Cl.
CPC .............. *B64C 25/22* (2013.01); *F15B 15/22* (2013.01); *F15D 1/0025* (2013.01); *B64C 25/34* (2013.01)

(58) Field of Classification Search
CPC ......... B64C 25/22; B64C 25/34; F15B 15/22; F15D 1/0025
See application file for complete search history.

(56) References Cited

U.S. PATENT DOCUMENTS

| | | | |
|---|---|---|---|
| 6,345,564 B1 * | 2/2002 | Kilner | B64C 25/34 91/169 |
| 2012/0112001 A1 * | 5/2012 | Bennett | B64C 25/60 244/102 SS |
| 2017/0088256 A1 * | 3/2017 | Kondo | F15B 15/226 |

FOREIGN PATENT DOCUMENTS

| | | |
|---|---|---|
| DE | 10 2006 041483 | 3/2008 |
| DE | 20 2013 003622 | 7/2014 |

(Continued)

OTHER PUBLICATIONS

International Search Report for PCT/EP2020/074507, dated Feb. 10, 2021, 5 pages.
(Continued)

*Primary Examiner* — Tye William Abell
(74) *Attorney, Agent, or Firm* — Nixon & Vanderhye P.C.

(57) ABSTRACT

Retraction of a landing gear assembly on an aircraft is actuated by a hydraulic actuator. The actuator includes a piston that travels within a cylinder along a stroke length between a first position corresponding to the landing gear assembly when extended and a second position corresponding to the landing gear assembly when retracted. The movement of the piston along its stroke length is snubbed at one end by a different amount according to the direction of travel, for example by use of an orifice plate that has a discharge coefficient that is greater in one direction than in the opposite direction. Asymmetric snubbing is thus provided, which enables the landing gear to retract faster.

19 Claims, 9 Drawing Sheets

(51) Int. Cl.
*F15D 1/00* (2006.01)
*B64C 25/34* (2006.01)

(56) References Cited

FOREIGN PATENT DOCUMENTS

EP  1 041 001   10/2000
EP  3 150 863    4/2017

OTHER PUBLICATIONS

Written Opinion of the ISA, for PCT/EP2020/074507, dated Feb. 10, 2021, 13 pages.

* cited by examiner

LANDING GEAR SYSTEM FOR AN AIRCRAFT

CROSS REFERENCE TO RELATED APPLICATIONS

The present application is a National Phase of International Application Number PCT/EP2020/074507 filed Sep. 2, 2020, which designated the U.S. and claims priority benefits from Great Britain Application Number GB 1913269.5 filed Sep. 13, 2019, the entire contents of each of which are hereby incorporated by reference.

BACKGROUND OF THE INVENTION

The present invention concerns a landing gear system for an aircraft including (a) a retractable landing gear assembly and (b) a hydraulic actuator for actuating retraction of the landing gear. The invention also concerns a method of operating a retractable aircraft landing gear and a hydraulic actuator configured for actuating retraction of a landing gear.

The present invention has particular application in relation to large commercial passenger aircraft, but may have application in relation to other types of aircraft having one or more landing gear assemblies which are arranged to extend (for example, to be deployed) and to retract. Retraction of the landing gear is typically performed with the use of a hydraulic actuator. A hydraulic actuator is the common term used for a hydraulic piston, ram or jack. Once retracted, the landing gear is typically stowed in a landing gear bay, which is closed off with the use of one or more landing gear bay doors. If the time taken for the landing gear to retract after take-off could be shortened that could enable drag to be reduced, by means of reducing the amount of time the landing gear is exposed in the airflow around the aircraft. Fully retracting the landing gear as soon as possible after take-off also has the potential advantage of providing greater clearance between the aircraft and any obstacles on the ground. Reducing the time a landing gear remains fully or partially deployed immediately after take-off, even by a fraction of a second, can have significant benefit.

Enlarging an actuator to increase the load it can exert can reduce the speed, and conversely shrinking the swept volume of an actuator to increase the speed can reduce the load. Speed control of rate of hydraulic actuation for a fixed size depends on flow supply, and flow metering. Landing gear actuators are required to reach the end of their travel without imparting large forces, or impacting at high speeds. There are limits therefore on the speed of travel at either end of the motion of the landing gear between the extended and retracted positions. The maximum speed of action of an actuator is typically governed by the saturation flow rate of the actuator, the rated flow of the hydraulic supply, and the load that the actuator is overcoming; these are factors which cannot easily be changed once an aircraft design has been certified.

The present invention seeks to mitigate one or more of the above-mentioned problems. Alternatively or additionally, the present invention seeks to reduce the time taken for landing gear retraction. Alternatively or additionally, the present invention seeks to provide an improved landing gear system for an aircraft and/or an improved hydraulic actuator for a landing gear system.

SUMMARY OF THE INVENTION

The present invention provides, according to a first aspect of the invention, a landing gear system for an aircraft, wherein the system includes a retractable landing gear assembly, and a hydraulic actuator for actuating retraction of at least a part of the landing gear assembly from an extended (e.g. deployed) configuration to a retracted (e.g. stowed) configuration. The landing gear system typically comprises a main strut at an extreme end of which there are mounted one or more aircraft wheels. The hydraulic actuator includes a piston that travels within a cylinder along a stroke length between a first position corresponding to the extended configuration of said part of the landing gear assembly and a second position corresponding to the retracted configuration of said part of the landing gear assembly. Movement of the piston along its stroke length is snubbed for a portion of the stroke length when proximate to, and moving in a direction towards, one of the first position and the second position. The snubbing, if any, is less when moving along the same portion of the stroke length but in the opposite direction. It is recognised that snubbing is primarily desirable to decelerate the movement of the landing gear immediately before it comes to a stop, but less desirable when moving in the opposite direction from the position in which it has previously stopped. Embodiments of the invention utilise asymmetric snubbing and, as such, can achieve a notional time saving on landing gear retraction of at least 0.5 seconds.

It may be that the movement of the piston along its stroke length is snubbed for a portion of the stroke length proximate to the first position when moving towards the first position and is snubbed, but by a lesser amount, for the same portion of the stroke length when moving away from the first position (i.e. asymmetric snubbing as between the snubbing for the end of the movement of the landing gear to its extended position, and the snubbing, if any, of the movement of the landing gear from its extended position when retraction is initiated). Alternatively or additionally, it may be that the movement of the piston along its stroke length is snubbed for a portion of the stroke length proximate to the second position when moving towards the first position and is snubbed, but by a lesser amount, for the same portion of the stroke length when moving away from the second position (i.e. asymmetric snubbing as between the snubbing for the end of the movement of the landing gear to its retracted position, and the snubbing, if any, of the movement of the landing gear from its retracted position when extension is initiated).

The actuator may be so arranged that the landing gear extends as the actuator extends. Alternatively, the actuator may be so arranged that the landing gear extends as the actuator retracts.

The snubbing of the movement of the piston is preferably provided by the flow of hydraulic fluid through a fixed shape passageway (for example an orifice plate). The shape of the passageway may be asymmetric along its length. Embodiments of the invention may thus provide asymmetric snubbing without introducing new moving parts in the actuator. Using moving parts for snubbing movement in an aircraft landing gear actuator (for example by means of a variable flow control device, such as a shuttling-flow control device or similar) is not ideal, because the moving parts may stick, move out of position, be susceptible to blockage and/or fail in other ways. If such a moving part were to fail open, such that it produces no snubbing, damage may be imparted to the actuator and associated structure which may lead to knock-on failures. If such a moving part were to fail closed, such that it continuously snubs or, worse, prevents the flow of hydraulic fluid by becoming obstructed, it may be that landing gear extension is compromised. A fixed shape passageway (for example in an orifice plate) does not have a fail open/closed failure mode due to its simple nature and thus does not involve as much risk as would using certain moving parts to provide variable snubbing. The use of additional moving parts in an actuator also complicates its design and manufacture and would increase cost.

The shape of the passageway (e.g. of the orifice plate) may be asymmetric along its length in that the manner in which the cross-sectional area of the passageway varies with distance in a direction from one end of the passageway to the other is different from how the cross-sectional area varies with distance in the opposite direction. The passageway may have a shape between its extreme ends which reduces to a minimum cross-sectional area in one direction along the passageway faster than it reduces to the same minimum cross-sectional area in the opposite direction. The walls of the passageway when viewed in cross-section (with the length of the passageway being horizontal) may in one direction reduce the size of the passage with steeper gradients (possibly including a discontinuity—a stepwise change in size of the passage) which are more extreme than when considering the rate of change of size of the passage in the other direction. The passageway may include a portion which tapers, for example in only one direction along passageway. The passageway may have a cross-sectional area that remains the same or reduces from one end to the other. The passageway may include a portion with walls that define a chamfer or a curved surface (e.g. a radius) to achieve the reduction in cross-sectional area with increasing distance in one direction along the length of the passageway. The angle of the chamfer may for example be between 10 and 70 degrees as measured relative to the axis (or length) of the passageway, and preferably between 30 and 60 degrees, optional about half a right angle. The passageway may include a step wise change in cross-sectional area in the other direction, for example a step-wise reduction immediately down to the minimum cross-sectional area of the passageway at (or proximate to) one extreme end of the passageway. The passageway may have a cross-sectional shape which presents a sharp edge to the flow of fluid in one direction, preferably only in one direction. The sharp edge could be in the form of a corner, step or the like. The flow of fluid towards a sharp edge that represents a quick/instant reduction in cross-sectional area, may on encountering the sharp edge be subject to less laminar-like flow, and possibly more turbulent flow, than occurs in the reverse direction. The different flow characteristics cause the flow rate in one direction to be greater than in the reverse direction, thus providing the desired asymmetry. The coefficient of discharge (or discharge coefficient) of a passageway may be at least 20% and possibly ~33% or more different in one direction as compared to the other. For example, the passageway may have a shape corresponding to a discharge coefficient of, for example 0.9 or more in a flow direction corresponding to reduced/no snubbing, and/or corresponding to a discharge coefficient of 0.7 or less in a flow direction corresponding to the full snubbing mode.

As mentioned above, the snubbing may be provided by means of the flow of hydraulic fluid through a passageway, there being more snubbing for fluid flow in one direction than in the opposite direction, as a result of the shape of the passageway. It may be that asymmetric snubbing is provided by means of one or more structures that are each fixed to, move with or form part of one of the passageway and the piston—such structures preferably being prevented from moving independently of said one of the passageway and the piston—during operation of the actuator. Said one or more structures may consist of the passageway.

There may be a portion of the passageway which has a shape extending from a position at or proximate to one of its extreme ends having a constant cross-section which has an area equal to the minimum cross-sectional area.

The passageway may comprise a structure (e.g. a disc, or an orifice plate) with one or more perforations through which the hydraulic fluid flows.

The present invention has particular application to a hydraulic actuator which is arranged to actuate retraction of the landing gear assembly, for example the whole/entire landing gear, from its extended configuration to its retracted configuration. The invention may have other applications however, for other hydraulic actuators for use on the landing gear assembly or other aircraft structures.

The actuator may be provided with its own dedicated accumulator. The actuator may be provided separately from the hydraulic fluid that would normally be accommodated therein during use.

The landing gear system may be suitable for use on a commercial passenger aircraft, for example an aircraft suitable for transporting at least 50, for example at least 100, for example at least 200 passengers. For the purposes of the present specification the term commercial passenger aircraft also covers aircraft of an equivalent size configured for cargo and/or used on a non-commercial basis. The aircraft may have a maximum take-off weight (MTOW) of at least 20 tonnes, optionally at least 40 tonnes, and possibly 50 tonnes or more. The aircraft may have an operating empty weight of at least 20 tonnes, optionally at least 30 tonnes, and possibly about 40 tonnes or more.

According to a further aspect of the invention there is provided a method of operating an aircraft landing gear which is movable between a deployed position (e.g. down and locked position) suitable for supporting a portion of the weight of the aircraft on the ground and a stowed position (e.g. an up and locked position). There may be a step of moving the landing gear from the stowed position to the deployed position, such that the average speed (for example of the LG or of the piston of an actuator for moving the LG), $V_1$, at the end of the movement (for example the last 5% of the distance to be travelled by the landing gear as a percentage of the total distance from the stowed position to the deployed position and/or as a percentage of simple rotational movement if such is used to perform extension/retraction and/or as a percentage of the total distance travelled by the piston) is slower than the speed of the corresponding start of the movement in the opposite direction (e.g. from the deployed position to the stowed position). It may be that the end of the movement (e.g. the last 5%) is at an average speed, $V_1$, (whether average angular velocity or distance travelled by a part of the LG divided by time taken) and that $V_1$ is lower than the corresponding average speed, $V_2$, in respect of the movement midway through (of, for example, the middle 90% of the distance). The average speed, $V_3$, of the start of the movement of the landing gear in the opposite direction (i.e. from the deployed position to the stowed position), for example for the first 5% of the total movement from the deployed position to the stowed position, is preferably faster by at least 10% than $V_1$. It may be that $V_1$ is less than half of $V_2$. It may be that $V_2$ is greater than $V_3$. It may be that $V_3$ is greater than 120% of $V_1$. $V_1$ may be about 20 mms$^{-1}$ or less. $V_2$ may be about 40 mms$^{-1}$ or more.

The invention also provides a landing gear actuator. The actuator may be configured for use in a landing gear system, in accordance with any aspect of the present invention as claimed or described herein, possibly including any or all optional features relating thereto. The actuator may be configured for use in a method in accordance with any aspect of the present invention as claimed or described herein, possibly including any or all optional features relating thereto.

The actuator may be an aircraft landing gear retraction actuator. The actuator may be configured to provide asymmetric snubbing at an end of its stroke length, for example with the use of an orifice plate that has a discharge coefficient that is greater in one direction than in an opposite direction. The actuator may have a stroke length of 300 mm or more (possibly 500 mm or more). The actuator may include an associated accumulator.

The invention also provides an aircraft, or part therefor, comprising an apparatus in accordance with any aspect of the present invention as claimed or described herein, possibly including any or all optional features relating thereto.

The aircraft may comprise a power system, for example a hydraulic, electrical or other power system. The actuator may be connected to the power system to receive power therefrom. The power system may be connected to other aircraft systems for example one or more of the primary flight controls, secondary flight controls, braking system, cargo doors and others. In the case of a hydraulic power system, the system may comprise a liquid reservoir, one or more pumps, a manifold for distributing the liquid and a plurality of distribution lines connected to aircraft systems requiring hydraulic power.

The actuator, for example an end of the actuator, may be connected to the aircraft, for example to a mounting point, for example to a pin, located on the aircraft (i.e. not forming part of the landing gear assembly), for example located in a landing gear bay of the aircraft. Thus, a first end of the actuator may be connected to the landing gear (e.g. the main strut of the LG) and a second end of the actuator may be connected to the aircraft such that extension and/or retraction of the actuator causes the landing gear assembly to extend and/or retract. Movement, for example $_{retraction}$, of the actuator may cause the main strut to move away from the extended position towards the retracted position. Controlling the movement, for example the $_{extension}$, of the actuator may limit the speed at which the main strut moves away from the retracted position towards the extended position.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

The embodiments generally relate to an aircraft landing gear ("LG") retracted by an actuator which is configured to provide snubbing (i.e. essentially damping/decelerating the motion) at the end of its stroke length at each end, so that there is snubbing both immediately before the LG is fully extended (i.e. fully deployed) and immediately before the LG is fully retracted (i.e. fully stowed). Such snubbing ensures that the LG does not come to an abrupt stop when it reaches its intended position when being retracted or extended. The embodiments utilise asymmetric snubbing such that at the start of moving the LG away from the retracted position (and/or extended position) there is less or no snubbing, compared to the case in reverse—i.e. at the end of the movement of the LG to the retracted position (and/or extended position). It is thus possible to reduce the time it takes to retract a landing gear into its bay, yet retain snubbing at the end of the actuator's movement on deployment. This can all be achieved without needing to affect the design of the rest of the actuator or landing gear. It is estimated that, for certain commercial aircraft, reducing retraction time by one second could enable maximum take-off weight to be increased up to 1% for critical airworthiness climb-out cases.

Figure 1:
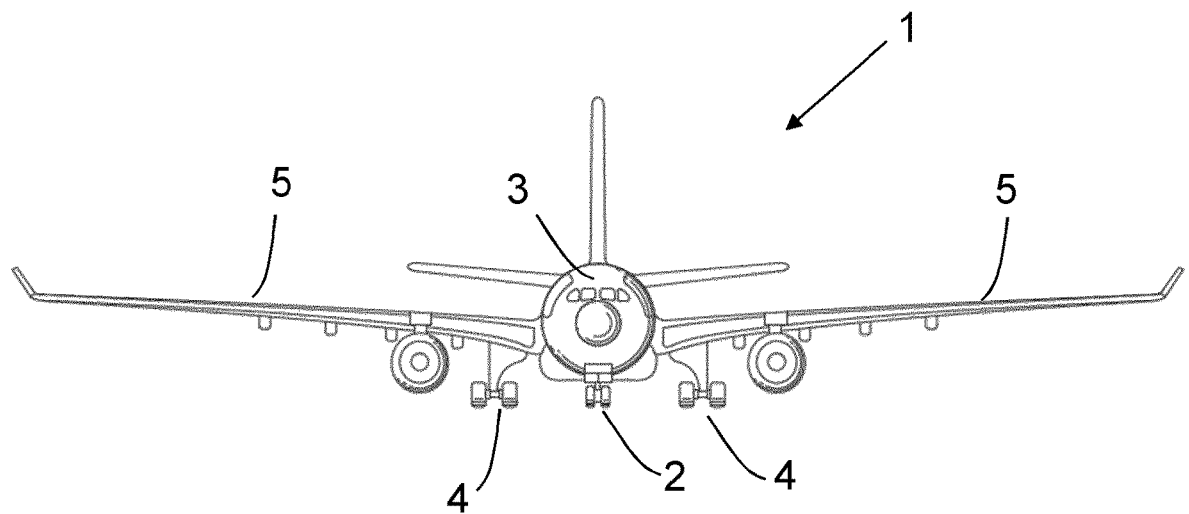
FIG. 1 is a front view of an aircraft according to a first embodiment of the invention, the aircraft including a retractable landing gear.
Figure 2:
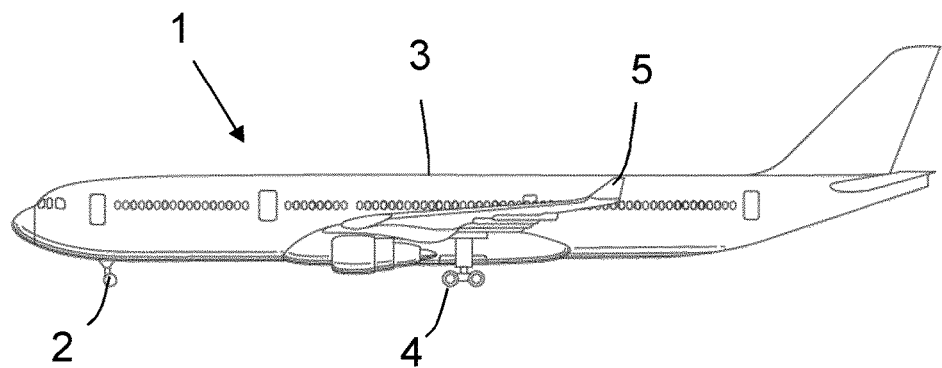
FIG. 2 is a side view of the aircraft shown in FIG. 1.

FIGS. 1 and 2 show an aircraft in accordance with a first example embodiment. The aircraft 1 comprises a fuselage 3 and wings 5. A nose landing gear ("NLG") 2 is mounted on the fuselage 3 and a main landing gear ("MLG") 4 is mounted to each wing 5. Both NLG and MLG are retractable into respective landing gear bays on the aircraft. All LG on the aircraft could utilise the benefits of the present embodiment, but the description that follows will refer by way of example only to a MLG and its associated retraction actuator.

Figure 3:
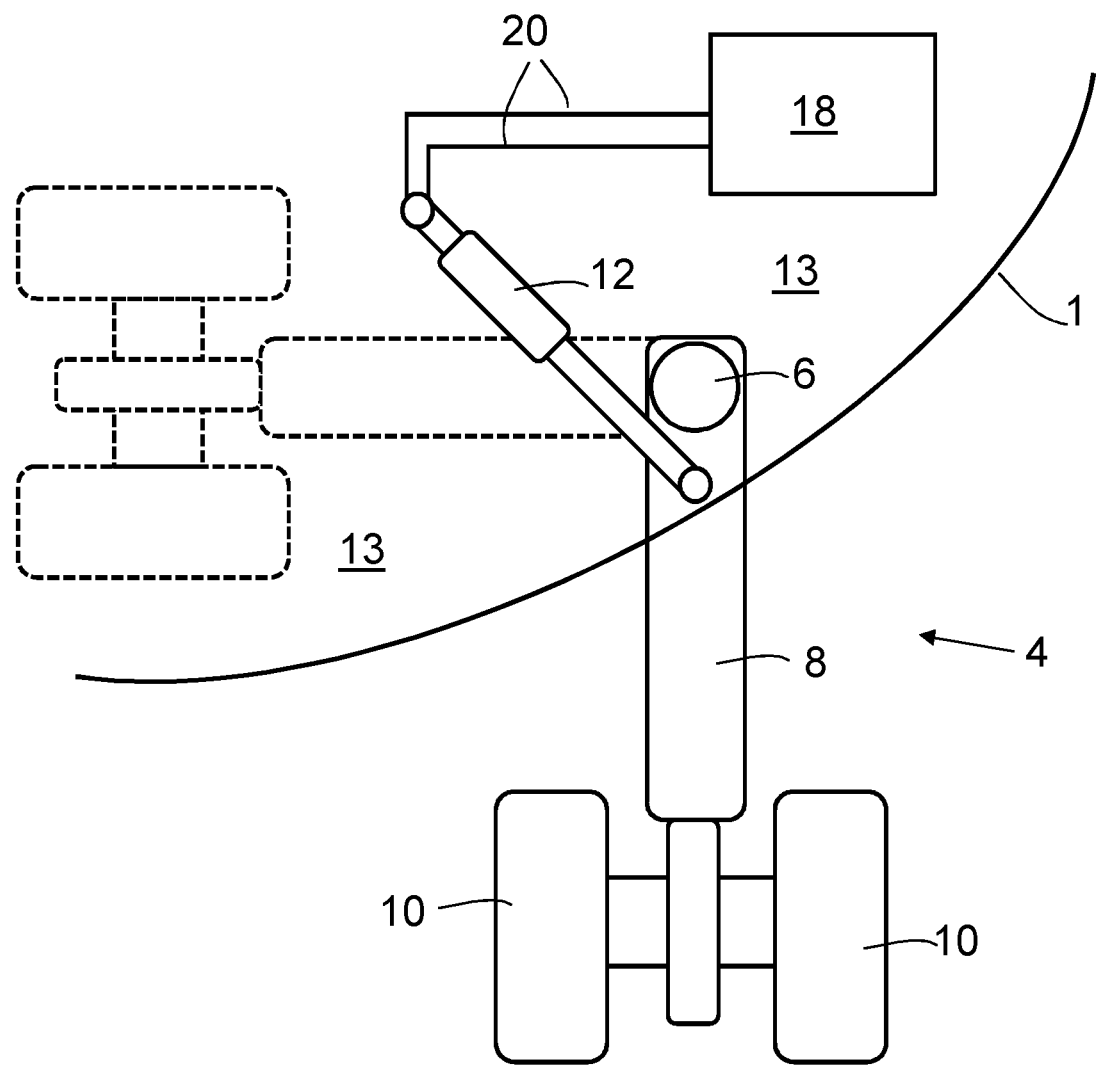
FIG. 3 shows the retractable landing gear of FIG. 1 in an extended configuration.

FIG. 3 shows a close up of a schematic view of a main landing gear 4 of the first embodiment in an extended configuration (i.e. deployed). For comparison, the position of some elements of the landing gear when the landing gear is retracted is indicated using dashed lines in FIG. 3. The main landing gear 4 is mounted on the aircraft 1 via a pintle 6 located at the upper end of a main strut 8. Two pairs of wheels 10 are mounted at the lower end of the main strut 8 on a bogie.

An actuator 12 is attached at one end to the main strut 8 and at the other end to the aircraft 1 at a point located within landing gear bay 13. Other links and support struts are provided to react loads sustained by the landing gear when extended and supporting the weight of the aircraft, and there are various lock and unlock mechanisms for locking/releasing the LG during use, but are not shown in FIGS. 3 and 4 for the sake of clarity. The actuator 12 is connected to hydraulic system 18 via hydraulic supply lines 20. It will be noted that the actuator is in a fully extended configuration when the LG is extended fully.

Figure 4:
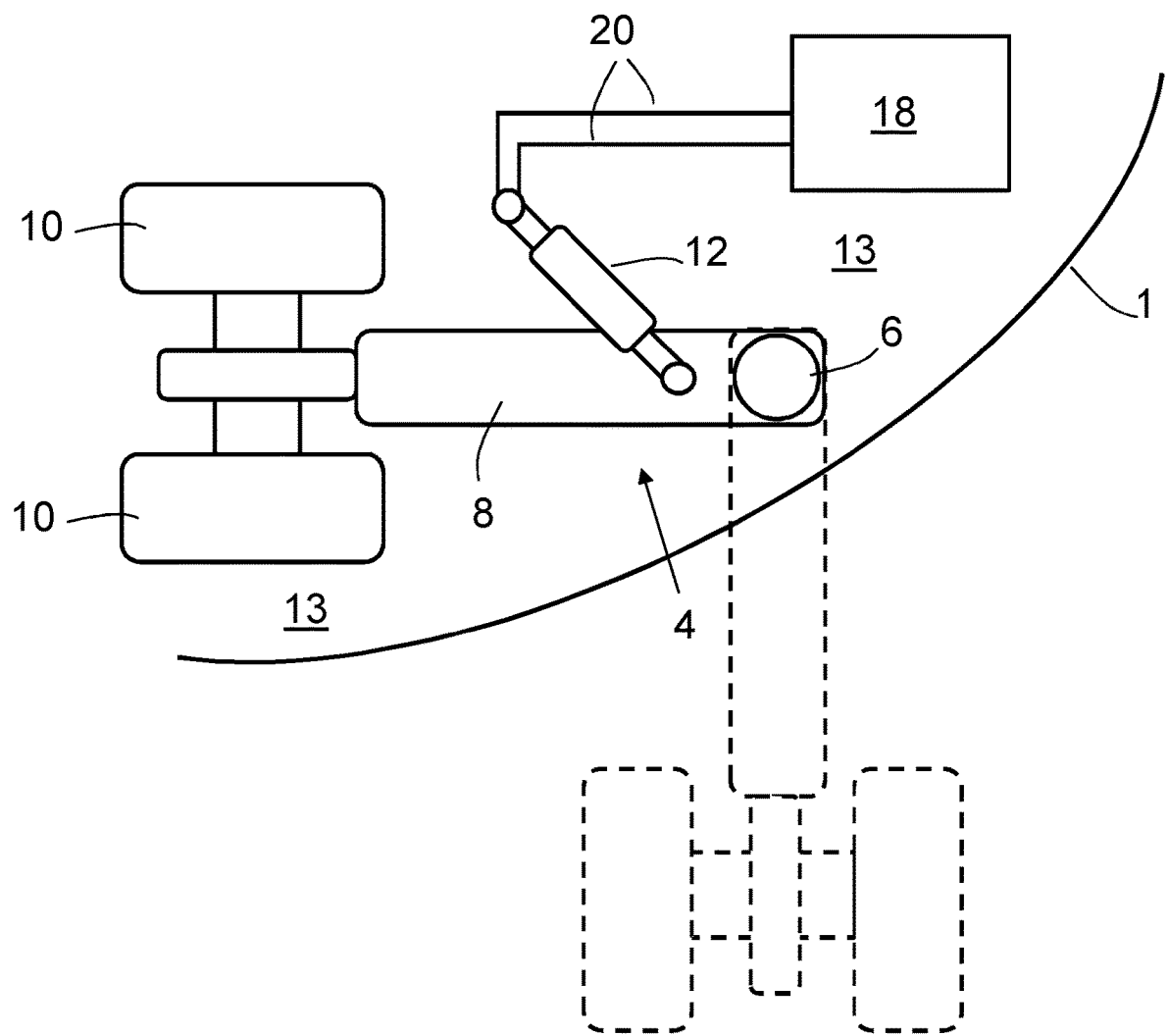
FIG. 4 shows the retractable landing gear of FIG. 1 in a retracted configuration.

FIG. 4 shows a schematic view of the main landing gear 4 in the retracted configuration (i.e. fully stowed with its wheels 10 located within landing gear bay 13). For comparison, the position of some elements of the landing gear when the landing gear is extended is indicated using dashed lines in FIG. 4. In FIG. 4, the main strut 8 is rotated by about 90 degrees relative to its position in FIG. 3. It will be noted that the actuator is in a fully retracted configuration when the LG is retracted fully.

In use, the landing gear 4 is released from the retracted position by unlocking a locking mechanism (not shown), for example prior to landing. The main strut 8 and the wheels 10 attached thereto drop under the action of gravity with the motion being determined by the flow of hydraulic fluid through the actuator 12. The landing gear 1 is locked in the extended position, for example using a locking actuator (not shown). The landing gear remains in the extended position during landing, taxiing and take-off. Following take-off the landing gear is unlocked and the actuator 12 moves the main strut from the extended position to the retracted position using force generated from pressure provided by the hydraulic system 18.

Figure 5:
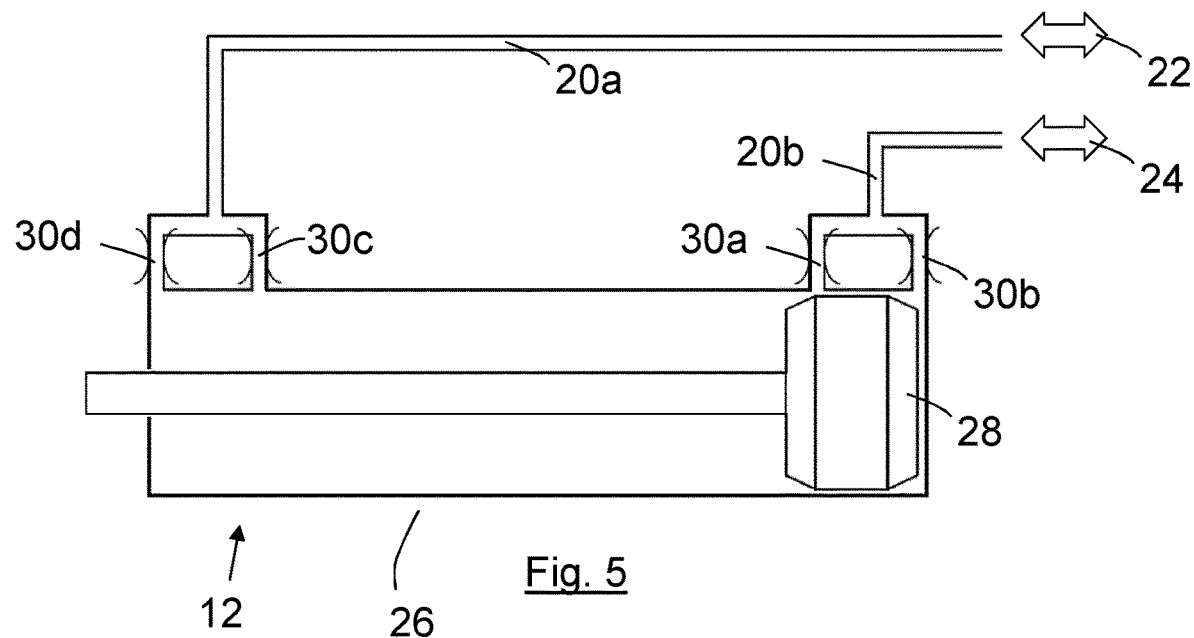
FIGS. 5 to 8 show the hydraulic actuator of FIG. 1 during various stages of operation.

FIGS. 5 to 8 show the actuator 12 at various stages during the retraction process. FIG. 5 shows the actuator 12 and the ends of first and second hydraulic fluid lines 20a, 20b and two double-headed arrows 22, 24, which are included to show that fluid may be caused to flow in one direction or the other. Thus, the first fluid line 20a acts as a supply line when the actuator is retracting and the second supply line 20b acts as a return line; whereas, when the actuator is extending, the first fluid line 20a acts as a return line and the second supply line 20b acts as a supply line. The actuator 12 comprises a cylinder 26, in which a piston 28 travels. When the actuator is commanded to extend the LG, pressure is supplied via the second fluid line 20b, and flow ports 30a, 30b, and the piston 28 moves to the left (as shown in FIGS. 5 to 8) through the position shown in FIG. 6 to the position shown in FIG. 7. At the position shown in FIG. 6, the rate of flow of hydraulic fluid is at its maximum (often termed 'free flow', 'unsnubbed flow' or 'unrestricted flow'). In this phase of extension, the piston speed may be calculated as $(Pi \times R^2)/$fluid flow rate, where R is the inner radius of the cylinder. The free flow portion of the actuator stroke may comprise about 75% to 80% of the total time of movement of the piston. The remaining motion is snubbed with the piston travelling over a proportionally much shorter distance. In free-flow, the piston travels at a speed of about 100 mm/sec.

Figure 6:
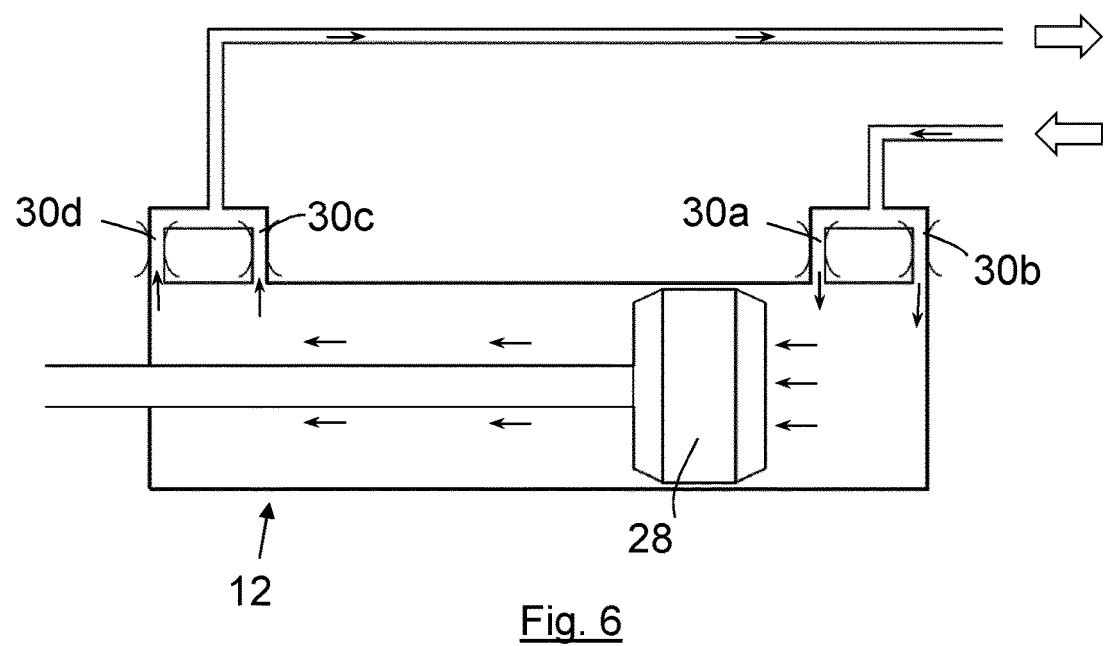
Figure 7:
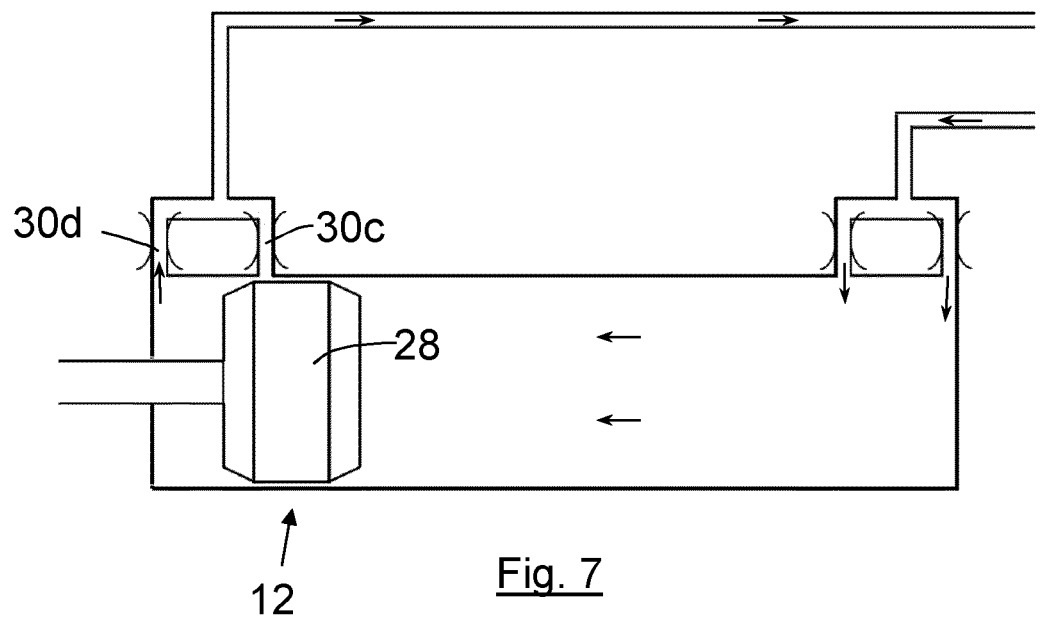
Figure 8:
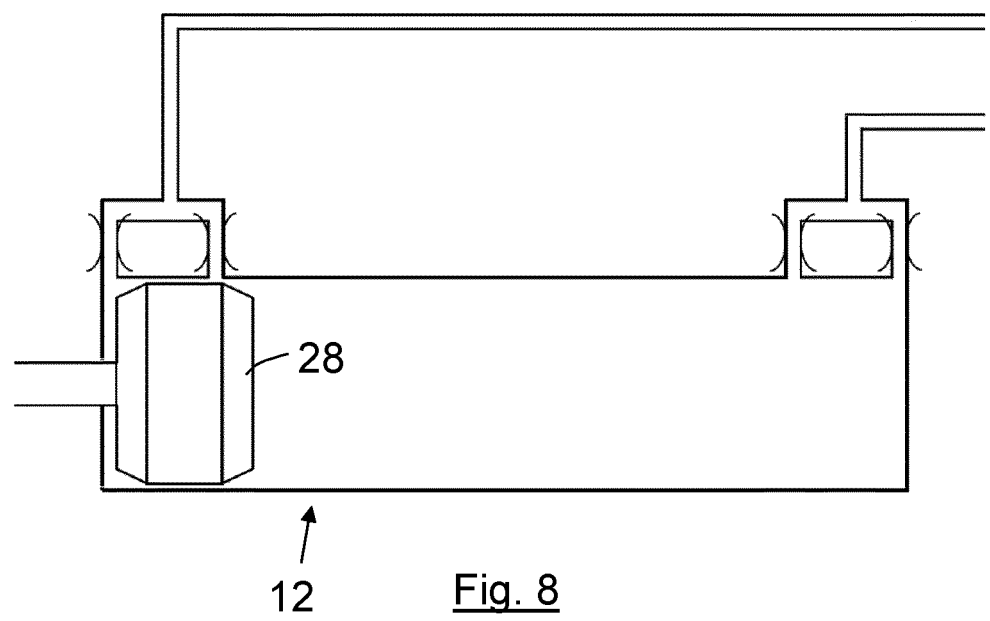

As shown in FIG. 6, fluid flows into the cylinder 26 through ports 30a, 30b and out via ports 30c, 30d. At the point at which the piston 28 reaches the position shown in FIG. 7, port 30c is closed by the piston 28, thus forcing all return fluid to flow via port 30d. The port 30d includes a specially shaped orifice plate, which provides for asymmetric snubbing. During the extension phase, full snubbing is provided by the orifice plate in port 30d. In this fully snubbed portion of the stroke the piston travels at a reduced speed of about 30 mm/sec, covering the last 50 mm of the movement in about 1½ seconds. FIG. 8 shows the piston 28 in the full extended position corresponding to the extended configuration of the LG. When the LG is commanded to retract, reduced snubbing (as compared to the snubbing provided during the extension phase) is provided by the orifice plate in port 30d, as a result of its asymmetric shape. The piston travels at a speed of about 50 mm/sec, still slower than free-flow, but significantly faster than full snubbing in the reverse direction. At about 1 second, the time taken for the piston to move the first 50 mm of its 1,000 mm stroke length from the fully extended position is about 0.5 seconds quicker than the time taken for the piston to move the last 50 mm of its 1,000 mm stroke length on approaching the fully extended position. The time taken to retract the LG may thus be considered to have been shortened by ~0.5 seconds. The time during which the actuator moves, when retracting the LG, is about 10 to 12 seconds or so, and the full process of retracting the LG (with unlocking/locking of locks, opening/closing of LG bay doors) takes about 15 seconds.

The asymmetric snubbing of the movement of the piston being provided by a fixed shape orifice plate will now be explained briefly with reference to FIGS. 9 to 13. The velocity of fluid and therefore of the piston, in the snubbed phase, is dominated by the discharge coefficient (or Cd) of the passageway through the orifice plate.

The discharge coefficient Cd can be calculated by using the formula:

$$Cd = Mf/(A\sqrt{2 \times \rho \times \Delta P}), \text{ where}$$

Mf is the mass flow rate, ρ is the fluid density, A is the cross-sectional area of the narrowest point passage, and Δ P is the pressure drop across the narrowest point passage.

Figure 9:
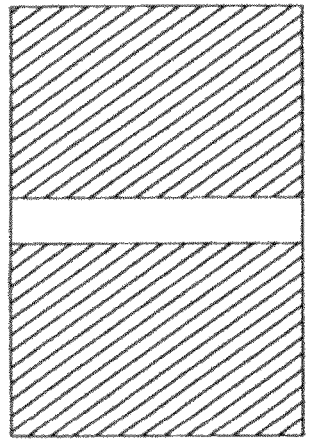
FIGS. 9 to 11 show examples of orifice plates for use in an actuator for the purposes of providing snubbing.
Figure 10:
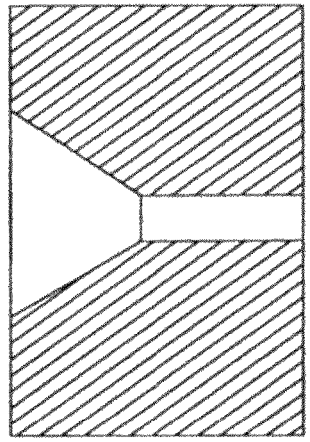
Figure 11:
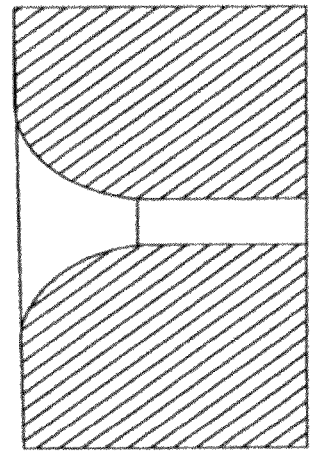

FIG. 9 shows a simple symmetrical sharp-edged orifice plate in the form of a disc with a hole in the centre. Such discs are very simple in design and can be 'tuned' to particular flow rates for a given fluid and temperature by adjusting the size of the hole. Thus, the orifice plate of FIG. 9 has a passageway (orifice) having a fixed cross-section and a symmetrical Cd of about 0.6 in both directions. FIG. 10 shows a first asymmetric passageway of the office plate of a type used in the first embodiment. The passageway comprises a section of tapering passageway with a linear chamfer, such that the cross-sectional area reduces linearly with increasing distance along the tapered passage from the widest point, at one side of the orifice plate, to the narrowest point near the middle of the passageway though the plate. The passageway comprises a section of passageway with a constant cross-section that extends from one side of the orifice plate to the narrowest point of the tapered passage. The narrowest part has a diameter of the order of 1 mm or so. The passageway is thus relatively easy to machine. Viewed in FIG. 10, the Cd of the orifice the Cd of the orifice plate for fluid flowing from left to right is about 0.90, whereas the Cd of the orifice plate for fluid flowing from right to left is about 0.60. FIG. 11 shows an alternative example of an asymmetric passageway of an orifice plate of a type suitable for use in an embodiment of the invention. The passageway comprises a section of tapering passageway with a curved chamfer (or a radius profile), such that the cross-sectional area reduces progressively slower with increasing distance along the tapered passage from the widest point, at one side of the orifice plate, to the narrowest point near the middle of the passageway though the plate. The passageway comprises a section of passageway with a constant cross-section that extends from one side of the orifice plate to the narrowest point of the tapered passage. Viewed in FIG. 11, the Cd of the orifice plate for fluid flowing from left to right is about 0.98, whereas the Cd of the orifice plate for fluid flowing from right to left is about 0.60.

Figure 12:
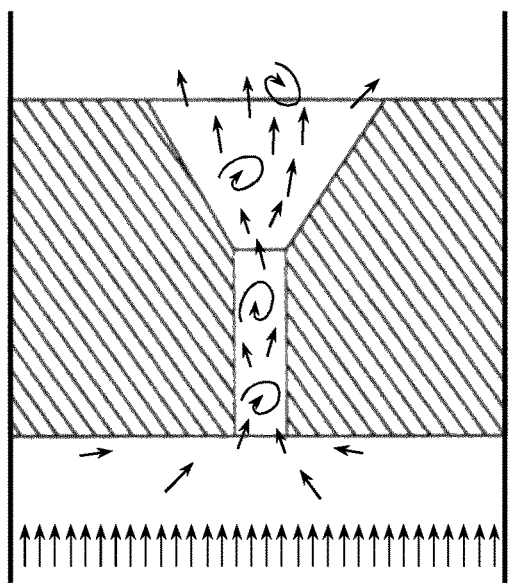
FIGS. 12 and 13 show fluid flow through the orifice plate of FIG. 10.
Figure 13:
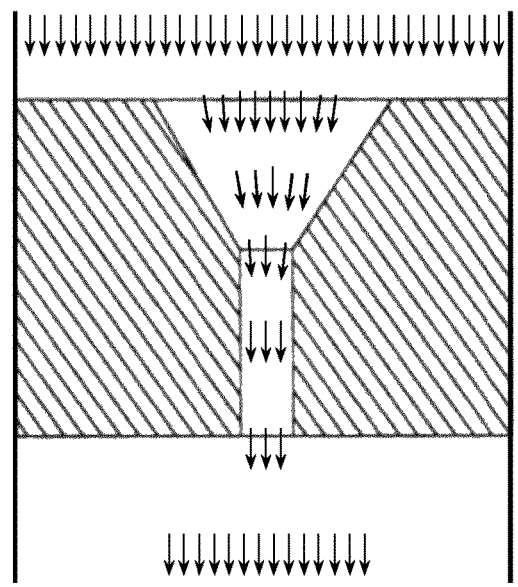

FIGS. 12 and 13 show schematically why the Cd of the orifice plate can differ according to the direction of flow. The orifice plate of FIG. 10 is shown, firstly in FIG. 12 in a fully snubbing mode where fluid flows upwards (in FIG. 12) corresponding to Cd=0.60 and secondly in FIG. 13 in a reduced snubbing mode where fluid flows downwards (in FIG. 13) corresponding to Cd=0.90. In FIG. 12, the fluid initially "sees" a sharp edge and a very rapid reduction in cross-sectional area as the fluid enters the orifice plate. The cross-sectional area reduces almost immediately to its minimum value. The smooth low-friction laminar flow immediately preceding the orifice plate is immediately disrupted resulting in inefficient fluid flow through the plate in the direction of flow shown in FIG. 12. In FIG. 13, however, the fluid is initially presented with a smoother edge and a larger (wider diameter) hole, followed by a more gradual reduction in cross-sectional area to the minimum area which is not encountered until the fluid is almost halfway through the orifice plate. The smooth low-friction laminar flow immediately preceding the orifice plate is not affected so much, thus resulting in more laminar flow overall than in FIG. 12, and therefore better (less restricted) flow of fluid through the plate in the direction of flow shown in FIG. 13.

Figure 14:
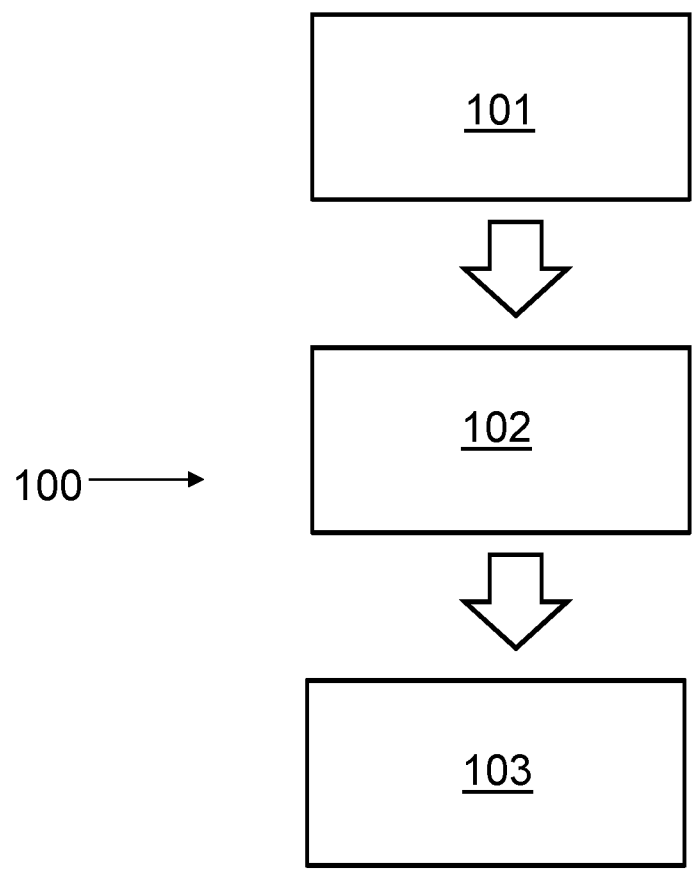
FIG. 14 is a flowchart illustrating the steps of a method of operating a landing gear in accordance with a second embodiment.

FIG. 14 shows a flowchart illustrating a method 100 (according to a second embodiment) of operating an aircraft landing gear, which could be of the type described in respect of the first embodiment. The method starts (represented by box 101) with the landing gear in its stowed position. Then (box 102) the LG is moved to the deployed position. The total stroke length is 1000 mm. The first 50 mm (snubbed) takes 1.5 seconds. The next 900 mm takes 9 seconds. The last 50 mm takes 1.5 seconds. Thus, the last 5% of the distance to be travelled by the landing gear is at an average speed, $V_1$, of 33 mms$^{-1}$. This is lower (less than half of) the average speed, $V_2$, for the middle 90% of the distance, being 100 mms$^{-1}$. The method then includes a step (box 103) of moving the landing gear from the deployed position to the stowed position, the first 50 mm of movement happening within 1 second, corresponding to an average speed, $V_3$, of about 50 mms$^{-1}$, thus being greater than $V_1$ by at about 50%.

Figure 15:
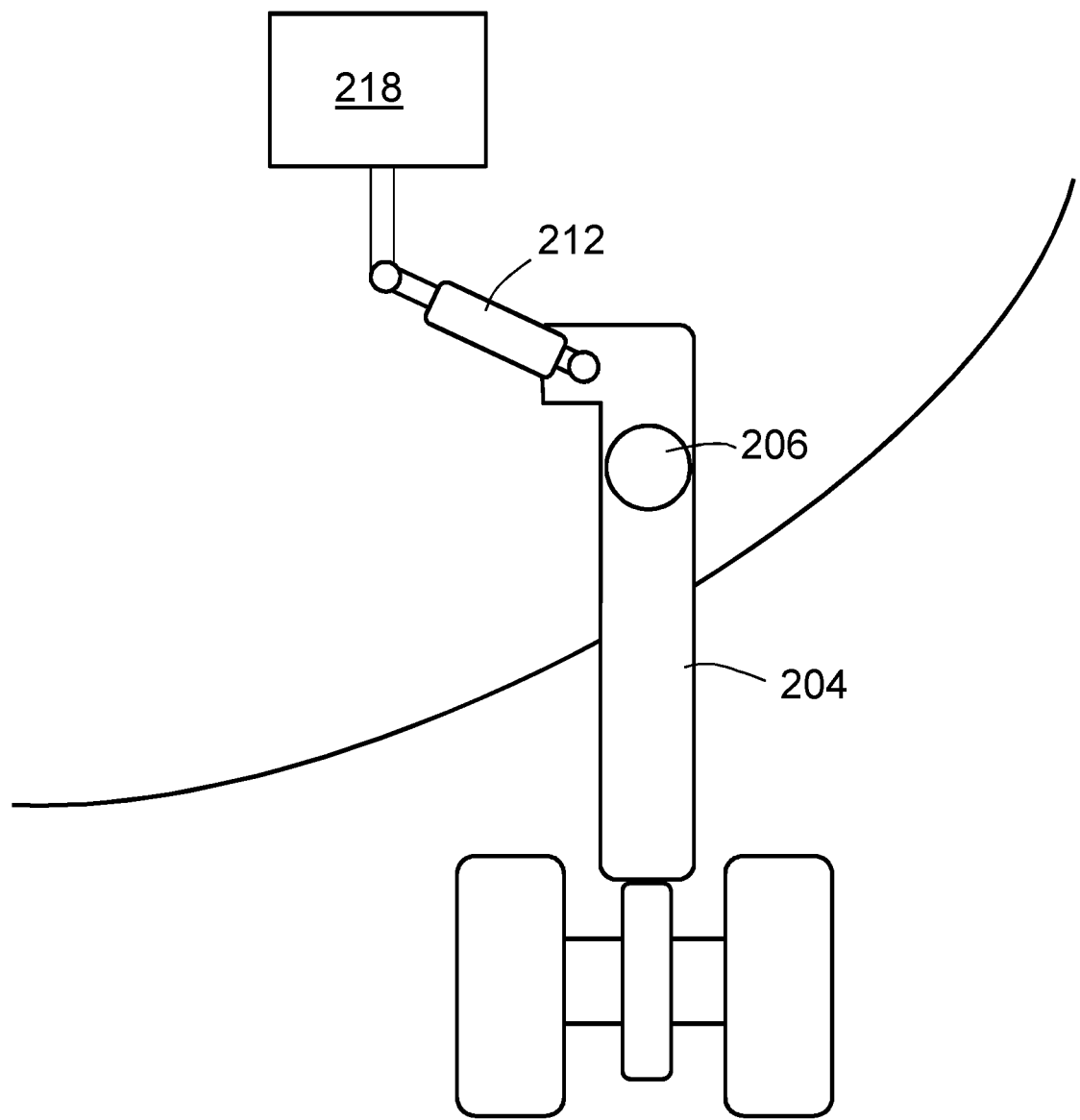
FIG. 15 shows the retractable landing gear of an aircraft according to a third embodiment of the invention, with the landing gear in an extended configuration.
Figure 16:
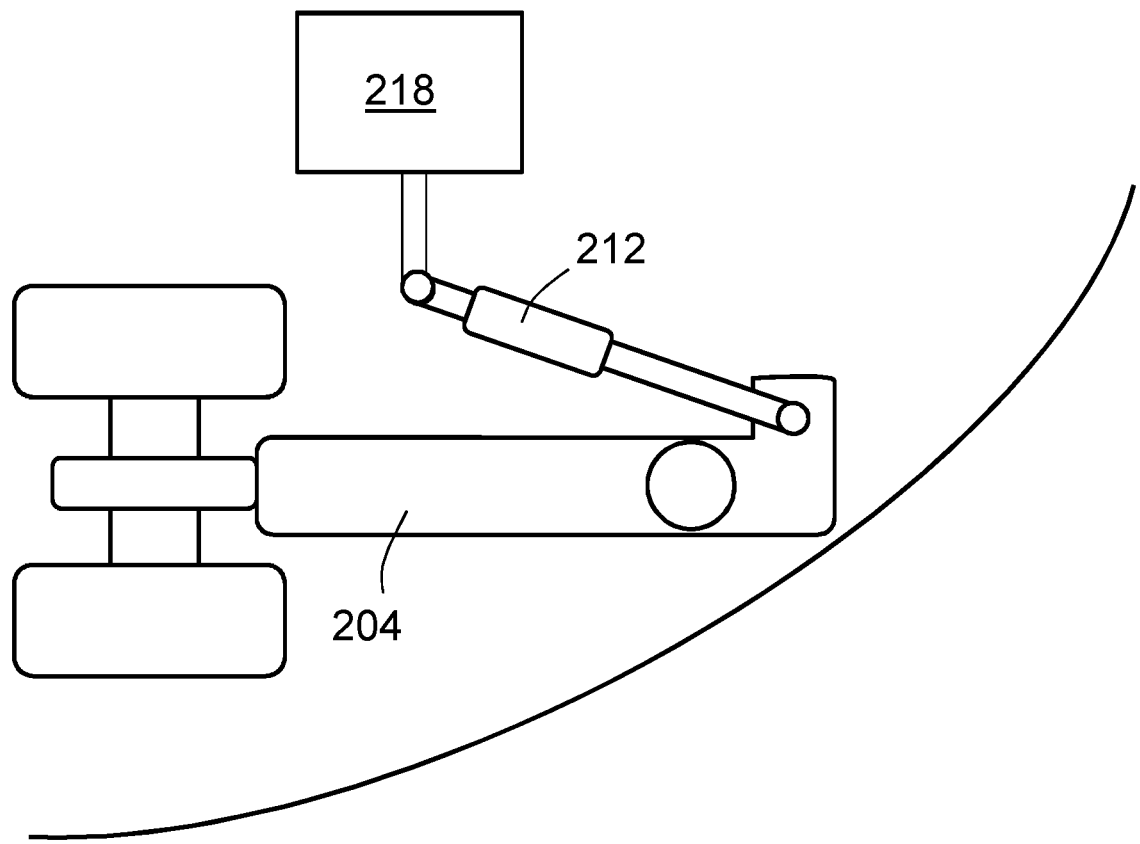
FIG. 16 shows the retractable landing gear of FIG. 15 in a retracted configuration.

FIGS. 15 and 16 show a main landing gear (MLG) 204 for an aircraft of a third embodiment. The differences between the first and third embodiments can be discerned by comparing FIG. 3 with FIG. 15 and comparing FIG. 4 with FIG. 16, but will also now be briefly described. FIG. 15 shows the MLG 204 in the extended position. An actuator 212 is attached at one end of the MLG 204 to structure of the MLG that is above (in FIG. 15) the pintle 206 and at the other end to the aircraft at a point located within landing gear bay. The actuator 212 is connected to a hydraulic system 218 in a similar manner to the first embodiment. It will however be noted that the actuator is in a fully retracted configuration when the LG is extended fully. FIG. 16 (compare with FIG. 4) shows a schematic view of the MLG 104 in the fully retracted configuration. In FIG. 16, the main strut of the MLG is rotated by about 90 degrees relative to its position in FIG. 15. It will be noted that the actuator is in a fully extended configuration when the LG is retracted fully. Asymmetric snubbing with the use of an asymmetric orifice plate may thus be utilised for the motion immediately leading up to, and away from the LG being in its retracted configuration.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In FIG. 2 two wheels 10 are shown in a diablo type arrangement, but in other embodiments further wheels may be included and/or may be used.

The embodiment(s) described above, relating to retraction of the entire landing gear, may have application to other types of LG actuators on the aircraft, or indeed actuators used to operate other moving parts on the aircraft.

The orifice plate could additionally or alternatively comprise a perforated disc with more than one perforation through which the hydraulic fluid flows.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments. The term 'or' shall be interpreted as 'and/or' unless the context requires otherwise.

The invention claimed is:

1. A landing gear system for an aircraft, wherein the system includes
   a retractable landing gear assembly, and
   a hydraulic actuator for actuating retraction of at least a part of the landing gear assembly from an extended configuration to a retracted configuration,
   the hydraulic actuator including a piston that travels within a cylinder along a stroke length between a first position corresponding to the extended configuration of said part of the landing gear assembly and a second position corresponding to the retracted configuration of said part of the landing gear assembly, and
   movement of the piston along its stroke length being snubbed for a portion of the stroke length when proximate to, and moving in a direction towards, one of the first position and the second position, and wherein the snubbing, if any, is less when moving in the opposite direction, there thus being provided asymmetric snubbing,
   the asymmetric snubbing being provided by the flow of hydraulic fluid during both directions of travel of the piston through a passageway connected to a first hydraulic supply line and including a cross-sectional shape which tapers in one direction such that there is more snubbing for fluid flow in one direction than in the opposite direction, as a result of the shape of the passageway, and
   wherein the passageway has a discharge coefficient of 0.9 or more in a flow direction corresponding to the snubbing, if any, when the piston is moving in said opposite direction.

2. The landing gear system according to claim 1, wherein the shape of the passageway is asymmetric along its length, and the shape when there is snubbing with fluid flowing in one direction is the same as the shape when there is snubbing with fluid flowing in the opposite direction.

3. The landing gear system according to claim 1, wherein the passageway has a cross-sectional shape which presents a corner or step to the flow of fluid in one direction.

4. The landing gear system according to claim 1, wherein the hydraulic actuator is arranged to actuate retraction of the landing gear assembly from its extended configuration to its retracted configuration.

5. The landing gear system according to claim 1, wherein the landing system comprises a main strut at an extreme end of which there are mounted one or more aircraft wheels.

6. The landing gear system according to claim 1, wherein the passageway has a shape between its extreme ends which reduces to a minimum cross-sectional area in one direction along the passageway faster than it reduces to the same minimum cross-sectional area in the opposite direction.

7. The landing gear system according to claim 6, wherein a portion of the passageway has a shape extending from a position at or proximate to one of its extreme ends having a constant cross-section which has an area equal to the minimum cross-sectional area.

8. An aircraft landing gear retraction actuator for the landing gear system of claim 1, wherein the actuator is configured to provide asymmetric snubbing at an end of its stroke length with the use of an orifice plate that has a discharge coefficient that is greater in one direction than in an opposite direction.

9. The actuator according to claim 8, wherein the actuator has a stroke length of 300 mm or more.

10. An aircraft comprising the landing gear retraction actuator of claim 8.

11. A hydraulic actuator configured for use as the hydraulic actuator of the landing gear system according to claim 1.

12. An aircraft comprising the landing gear system of claim 1.

13. A landing gear system for an aircraft, wherein the system includes
a retractable landing gear assembly, and
a hydraulic actuator for actuating retraction of at least a part of the landing gear assembly from an extended configuration to a retracted configuration,
the hydraulic actuator including a piston that travels within a cylinder along a stroke length between a first position corresponding to the extended configuration of said part of the landing gear assembly and a second position corresponding to the retracted configuration of said part of the landing gear assembly,
movement of the piston along its stroke length being snubbed for a portion of the stroke length when proximate to, and moving in a direction towards, one of the first position and the second position, and wherein the snubbing, if any, is less when moving in the opposite direction, there thus being provided asymmetric snubbing,
the asymmetric snubbing being provided by the flow of hydraulic fluid during both directions of travel of the piston through a passageway connected to a first hydraulic supply line and including a cross-sectional shape which tapers in one direction such that there is more snubbing for fluid flow in one direction than in the opposite direction, as a result of the shape of the passageway, and
wherein a portion of the passageway comprises a structure with a plurality of perforations through which the hydraulic fluid flows.

14. A landing gear system for an aircraft, wherein the system includes
a retractable landing gear assembly, and
a hydraulic actuator for actuating retraction of at least a part of the landing gear assembly from an extended configuration to a retracted configuration,
the hydraulic actuator including a piston that travels within a cylinder along a stroke length between a first position corresponding to the extended configuration of said part of the landing gear assembly and a second position corresponding to the retracted configuration of said part of the landing gear assembly,
movement of the piston along its stroke length being snubbed for a portion of the stroke length when proximate to, and moving in a direction towards, one of the first position and the second position, and wherein the snubbing, if any, is less when moving in the opposite direction, there thus being provided asymmetric snubbing,
the asymmetric snubbing being provided by the flow of hydraulic fluid during both directions of travel of the piston through a passageway connected to a first hydraulic supply line and including a cross-sectional shape which tapers in one direction such that there is more snubbing for fluid flow in one direction than in the opposite direction, as a result of the shape of the, and
wherein the passageway has a discharge coefficient of 0.7 or less in a flow direction corresponding to the greater snubbing of the piston.

15. The landing gear system according to claim 14, wherein the shape of the passageway is asymmetric along its length, and the shape when there is snubbing with fluid flowing in one direction is the same as the shape when there is snubbing with fluid flowing in the opposite direction.

16. The landing gear system according to claim 14, wherein the passageway has a shape between its extreme ends which reduces to a minimum cross-sectional area in one direction along the passageway faster than it reduces to the same minimum cross-sectional area in the opposite direction.

17. The landing gear system according to claim 14, wherein the passageway has a cross-sectional shape which presents a corner or step to the flow of fluid in one direction.

18. A method of operating an aircraft landing gear comprising the landing gear system of claim 1, wherein the landing gear is movable between a deployed position suitable for supporting a portion of the weight of the aircraft on the ground and a stowed position, the method comprising the steps of
moving the landing gear from the stowed position to the deployed position, the last 5% of the distance to be travelled by the landing gear as a percentage of the total distance from the stowed position to the deployed position being at an average speed, $V_1$, that is lower than the average speed, $V_2$, for the middle 90% of the distance, and then
moving the landing gear from the deployed position to the stowed position, the first 5% of the distance to be travelled by the landing gear as a percentage of the total distance from the deployed position to the stowed position being at an average speed, $V_3$, that is greater than $V_1$ by at least 10%.

19. The method according to claim 18, wherein $V_1 < 50\%$ of $V_2$, and $V_2 > V_3 > 120\%$ of $V_1$.

* * * * *